United States Patent [19]
Goldsberry et al.

[11] Patent Number: 5,224,665
[45] Date of Patent: Jul. 6, 1993

[54] SPLIT SPAN VEE TAIL CONTROL ARRANGEMENT FOR AIR VEHICLE

[75] Inventors: Jon A. Goldsberry; Dirk A. Jungquist, both of San Diego, Calif.

[73] Assignee: General Dynamics Corporation, Convair Division, San Diego, Calif.

[21] Appl. No.: 712,290

[22] Filed: Jun. 10, 1991

[51] Int. Cl.⁵ .............................................. B64C 3/38
[52] U.S. Cl. ................................ 244/45 R; 244/47; 244/13; 244/90 R; 244/87; 244/75 R; 244/3.3
[58] Field of Search .............. 244/45 R, 47, 45 A, 244/13, 90 R, 87, 88, 91, 75 R, 3.24, 3.29, 3.3

[56] References Cited

U.S. PATENT DOCUMENTS

| 2,123,096 | 7/1938 | Charpentier | 244/45 A |
| 2,582,118 | 1/1952 | Haller | 244/13 |
| 2,941,754 | 6/1960 | Bouffort | 244/221 X |
| 3,415,468 | 12/1968 | Labombarde | 244/13 |
| 3,669,385 | 6/1972 | Glantz et al. | 244/13 |
| 3,954,231 | 5/1976 | Fraser | 244/45 A X |
| 4,354,646 | 10/1982 | Raymer | 244/47 X |
| 4,357,777 | 11/1982 | Kulik | 244/47 X |
| 4,424,946 | 1/1984 | Kramer | 244/90 R X |
| 4,598,885 | 6/1986 | Waitzman | 244/13 |

FOREIGN PATENT DOCUMENTS 0911287  6/1946  France .................................. 244/47

Primary Examiner—Galen Barefoot
Assistant Examiner—Christopher P. Ellis
Attorney, Agent, or Firm—John R. Duncan; Frank D. Gilliam

[57] ABSTRACT

An active flight control arrangement for an air vehicle that includes a split span vee fin tail control arrangement whereby inner and outer spans of each fin are independently operable to provide yaw, roll, and pitch control for an air vehicle in flight. The inner and outer spans of each fin are preferably not, but may be, in the same plane. An intermediate controllable span may also be provided between the inner and outer spans of each fin.

29 Claims, 3 Drawing Sheets

SPLIT SPAN VEE TAIL CONTROL ARRANGEMENT FOR AIR VEHICLE

BACKGROUND OF THE INVENTION

This invention relates to an improvement in the active flight control of an air vehicle, and more particularly, but not by way of limitation, to a split span fin tail control arrangement whereby inner and outer spans of each fin are independently operable to provide yaw, roll, and pitch control for an air vehicle in flight.

The control of air vehicles in flight, such as manned air vehicles, is provided by control surfaces located in the tail area of the vehicle. These controlled surfaces include the horizontal tail area which includes a horizontally disposed elevator of which approximately 60% is fixed with remainder being movable about an horizontal axis. In steady flight the function of the horizontal elevator is to balance or trim the air vehicle to ensure the resultant of all the air forces on the vehicle pass through its center of gravity. The trim control provided by the horizontal elevator provides longitudinal or pitch control of the air vehicle.

The vertical tail portion includes vertical stabilizing and controlling surfaces that are provided by a fixed fin and a movable rudder. These surfaces perform the same function as the rudder in a boat. The fixed fin provides directional stability; i.e., it provides a means to "yaw" the air vehicle and change the direction of flight and it is used to trim the air vehicle for straight flight. The control surfaces of the horizontal and vertical tail surfaces cooperate to control the roll of the vehicle in flight.

The term "air vehicles" is also considered to include unmanned air vehicles with which the present invention may be employed to particular advantage. Unmanned air vehicles may be used for missions such as the delivery of a payload in which the mission requirements necessitate guidance of the vehicle in flight to a precise target. Unmanned air vehicles may also be used for such tasks as day/night reconnaissance, surveillance and target acquisition systems which use the unmanned air vehicles as sensor platforms. The propulsion for an unmanned air vehicle may be provided by a rocket motor, gas turbine engine, or by a reciprocating internal combustion engine. Such unmanned air vehicles may be vertically launched or be launched in flight from a manned air vehicle.

Generally speaking, the most common means to provide longitudinal and directional stability for an unmanned air vehicle included a minimum of three active control fins and often four such fins. As opposed to the horizontal and vertical tail control surfaces commonly used for manned air vehicles as described above, the active control surfaces of an unmanned air vehicle provides for controllable movement of the entire fin about an axis normal to the center line of the air vehicle.

SUMMARY OF THE INVENTION

Briefly stated, the present invention provides a self propelled air vehicle, which may advantageously be of the unmanned type, that includes an elongated aerodynamically shaped air vehicle body adapted for flight, which body may be provided with wing means secured to the air vehicle body to provide lift during flight of the vehicle. The air vehicle body is provided with control surface means attached to the aft end of the vehicle body to provide yaw, pitch, and roll control of the vehicle when it is in flight. The control surface means include a pair of radially extending spaced apart control fin members, each control fin member provides at least two control surfaces. Preferably, the control fin members each comprise a split span fin wherein the inner and outer portions are independently controllable and do not fall within the same plane. The inner and outer control fins may or may not be ganged together as desired for optimum control of the air vehicle. The invention also contemplates that the inner and outer fin members may fall within the same plane and that an intermediate controllable fin member may also be provided.

Other features and attendant advantages of the present invention will become apparent to those skilled in the art from a reading of the following detailed description constructed in accordance with accompanying drawings and wherein:

DETAILED DESCRIPTION OF THE INVENTION

Figures 1, 2:
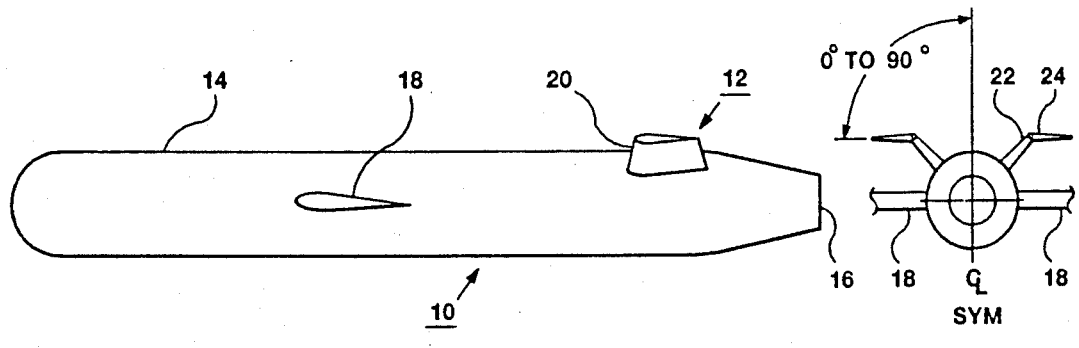
FIG. 1 is a side view of an exemplary air vehicle which incorporates the presently preferred embodiment of the control arrangement of the present invention.
FIG. 2 is an end view of the air vehicle of FIG. 2 and illustrates the split span fin control arrangement of a preferred embodiment of the instant invention.

Referring now to the drawings in detail and in particular to FIG. 1, the reference character 10 generally designates a self propelled air vehicle which incorporates a control surface means 12 constructed in accordance with a preferred embodiment of the present invention. The air vehicle 10 comprises an elongated aerodynamically shaped air vehicle body 14 which is provided with an internal propulsion means (not shown) having an outlet 16 at the aft end of the body 14. While the air vehicle body 14 is generally illustrated as being particularly suited for use as an unmanned air vehicle, the invention should not be considered to be limited to such application and could be employed in other advanced flight vehicles. The propulsion means of the air vehicle 10 could be the one most suitable for the particular application and mission.

The air vehicle body 14 is provided with suitable wing means attached to the body 14 which in the illustrated embodiment of the invention takes the form of two opposed wings 18. While wings 18 are illustrated, it is to be understood that in some applications of unmanned air vehicles the wings are omitted and only tail control surfaces are provided. The present invention is equally applicable to such applications.

Referring to FIGS. 1 and 2, it will be seen that the tail control arrangement mounted at the aft end of the vehicle 10 includes a pair of radially extending control fin members 20. Each control fin member 20 includes an inner fin 22 and an outer fin 24 that each control fin member 20 may be considered to be a split span fin member with the split occurring intermediate of the span of the fin member 20. In a presently preferred embodiment of the invention as seen in FIGS. 1 and 2, the inner and outer fins 22 and 24 do not fall in the same plane. Preferably, the inner fins 22 are separated by 90 degrees and the outer fins 24 do fall in the same plane. The control fin members 20 extend radially from the body of the air vehicle 10 at a predetermined angle which preferably is plus or minus 45 degrees from the vertical but which may be any angle up to 90 degrees in certain applications of the invention.

It is to be understood that the inner and outer control fins 22 and 24 are controllable, as by rotation, independently from each other. Similarly, the inner control fins 22 and the outer control fins 24 may be ganged together for a predetermined simultaneous operation or may be operated independently, depending on the requirements of the particular application.

Figure 3:
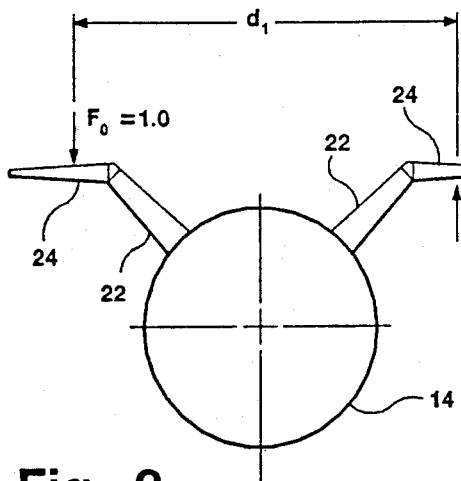
FIG. 3 is a diagrammatic view which illustrates the net torque that may be applied by the illustrated control arrangement to correct an undesirable roll condition of the air vehicle.
Figure 4:
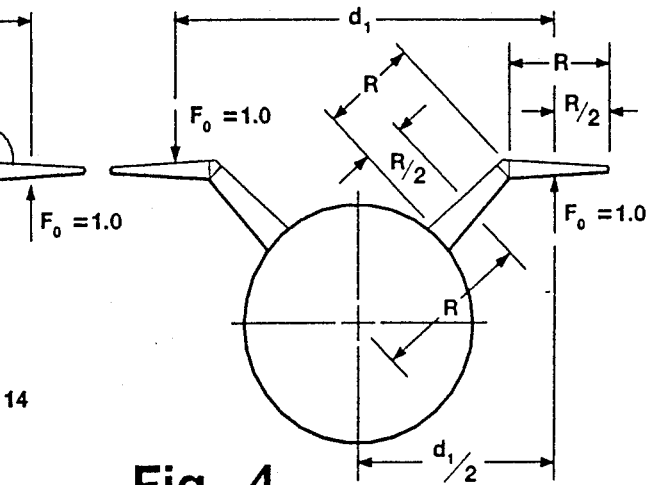
FIG. 4 is a diagrammatic force diagram which illustrates how the net torque provided by the illustrated control arrangement may be compared to that provided by a conventional control arrangement.

Referring now to FIGS. 3 and 4 it will be illustrated how the split span vee tail arrangement of the present invention provides equivalent control of the vehicle 10 to that provided by a conventional three to four control surface arrangement. For ease of illustration, in the succeeding Figures the wings 18 are not shown. Considering that the summation of the horizontal forces and the vertical forces acting on the air vehicle 10 are zero, it will be seen what moment forces may be placed on the vehicle 10 to correct and undesired roll condition. By appropriate deployment of the inner and outer span fins 22 and 24, the sum of the moments applied to the vehicle 10 is easily determined. Since $d\frac{1}{2}=1/0.707(R+0.5R)=2.62R$ so that $d1=5.24R$, the total moment is $2(2.62R(1))=5.24R$ counterclockwise. Reducing this, the sum of the moments is $1.41d(5.24)$ or $7.39d$ counterclockwise. This number would be $8.49d$ if both fins 20 were horizontally disposed (4.0 for force and $1.5d/0.707$ for arm). Thus, 7.39 divided by 8.49 indicates that the illustrated control arrangement 12 is 87% efficient as two horizontally disposed control fin members. It is believed that this is fully satisfactory for most applications.

Figure 5:
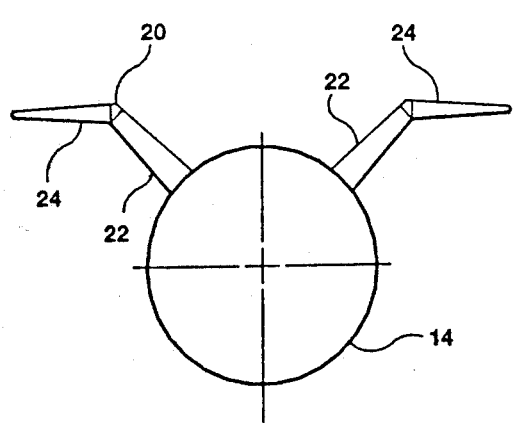
FIG. 5 is a diagrammatic view which illustrates the net side force that may be applied by the illustrated control arrangement to correct an undesirable yaw condition of the air vehicle.
Figure 6:
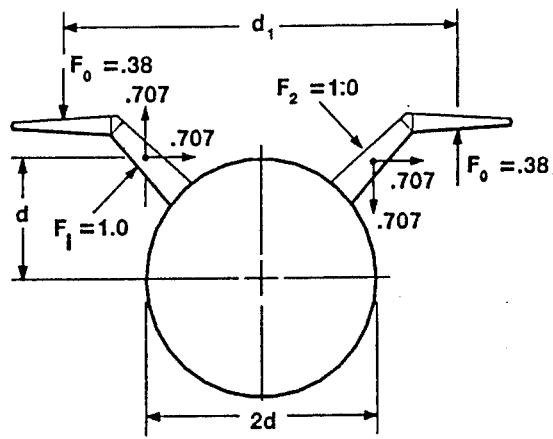
FIG. 6 is a diagrammatic force diagram for comparing the net side force provided by the illustrated control arrangement to a conventional control arrangement.

In FIGS. 5 and 6 it will be illustrated how the control arrangement of the present invention compares to a conventional tail control arrangement for a undesired yaw condition of the air vehicle 10. In this instance the sum of the vertical forces exerted on the air vehicle 10 is zero as are the sum of the moments. The sum of the horizontal forces is 2(0.707) right which results in a force of 1.414 right. If a vertical tail fin had been used the number would be 2.0. Thus, when 1.414 is divided by 2.0 it is apparent that the control arrangement 12 of the present invention is 71% efficient as a conventional vertical tail fin arrangement, a comparison which is suitable for most applications of the air vehicle 10.

Figure 7:
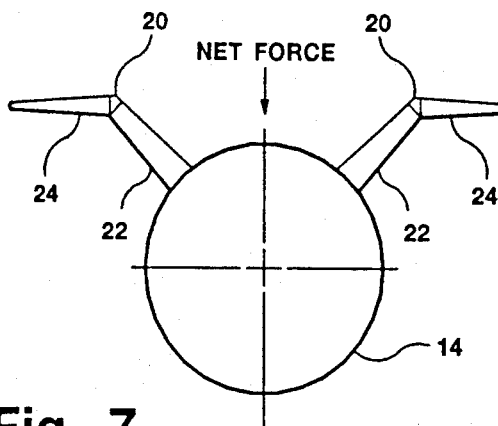
FIG. 7 is a diagrammatic view which illustrates the net vertical force that may be applied by the illustrated control arrangement to correct an undesirable pitch condition of the air vehicle.
Figure 8:
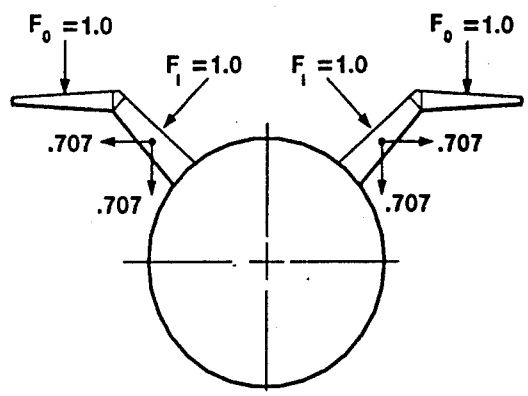
FIG. 8 is a diagrammatic force diagram for comparing the net vertical force provided by the illustrated control arrangement to a conventional control arrangement.

Referring now to FIGS. 7 and 8, a comparison of the control arrangement of the present invention will be compared to a conventional arrangement for an undesired pitch condition. In this instance it is to be understood that the summation of the horizontal forces and the moments exerted on the air vehicle 10 are zero. The summation of the vertical forces is 2(1) down plus 2(0.707) down which equals 3.41 down. This number would be 4.0 if the two fins were to be disposed horizontally in the conventional arrangement. Thus, 3.41 divided by 4.00 indicates that the split span vee fin preferred embodiment of the present invention is 85% efficient as the conventional horizontal tail arrangement. Again, this comparison indicates a suitable comparison for most application of the air vehicle 10.

Figure 9:
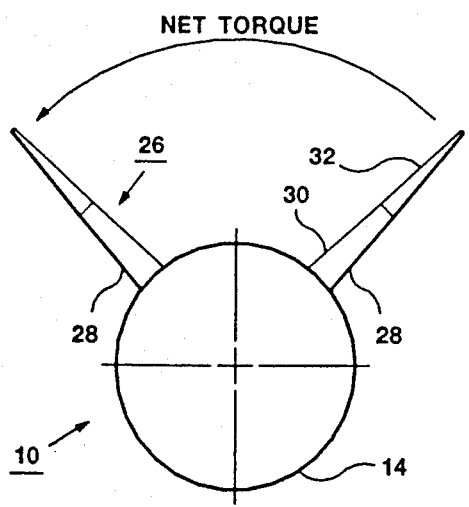
FIG. 9 is an end view of a second embodiment of the present invention and illustrates the net torque that may be applied to correct an undesirable roll condition of the vehicle.
Figure 10:
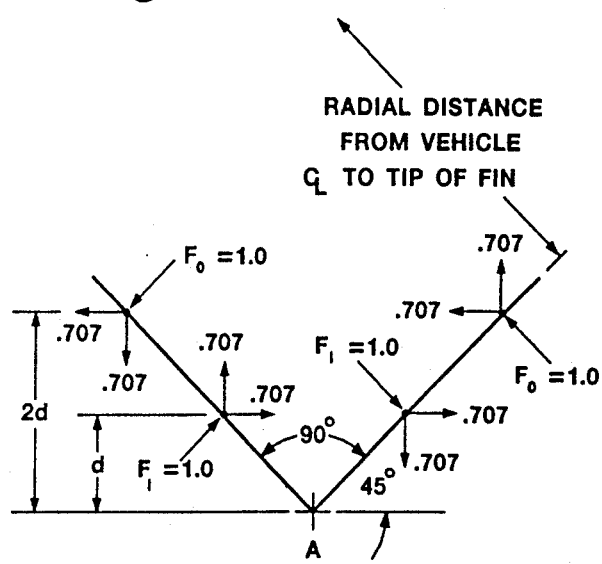
FIG. 10 is a simplified diagrammatic force diagram which illustrates how the net torque provided by the second embodiment control arrangement may be compared to that provided by a conventional control arrangement.
Figure 10A:
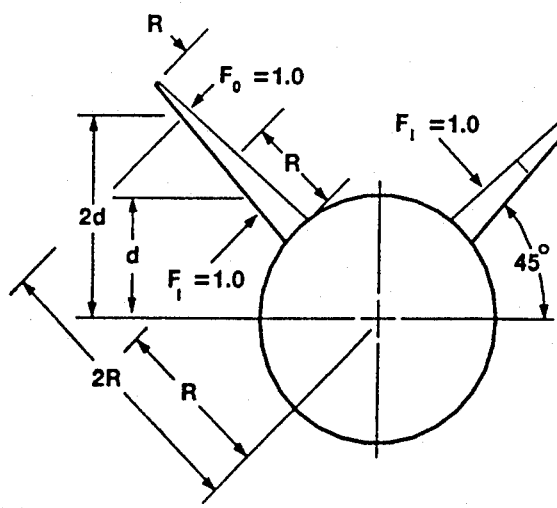

Referring now to FIGS. 9 and 10, a second embodiment of the invention is illustrated. As before, the reference character 10 generally designates a self propelled air vehicle which incorporates a control surface means 26 constructed in accordance with a second embodiment of the present invention.

Referring to FIGS. 9 and 10, it will be seen that the ail control arrangement 26 mounted at the aft end of the vehicle 10 includes a pair of radially extending control fin members 28. Each control fin member 28 includes an inner fin 30 and an outer fin 32 so that each control fin member 28 may be considered to be a split span fin member with the split occurring intermediate of the span of the fin member 28. In this second embodiment, both the inner and outer fin members 30 and 32 fall within the same plane. The control fin members 28 extend radially from the body 14 of the air vehicle 10 at a predetermined angle which preferably is 90 degrees but which may be an acute angle in certain applications of the invention.

It is to be understood that, as before, the inner and outer control fins 30 and 32 are controllable, as by rotation, independently from each other, Similarly the inner control fins 30 and the outer control fins 32 may be ganged together for a predetermined simultaneously operation or may be operated independently, depending on the requirements of the particular application.

It will now be illustrated how the split span vee tail arrangement of the second embodiment provides acceptable control of the vehicle 10 to that provided by a conventional three to four control surface arrangement. Considering that the summation of the horizontal forces and the vertical forces acting on the air vehicle 10 are zero, it will be seen what moment forces may be placed on the vehicle 10 to correct an undesired roll condition. By appropriate deployment of the inner and outer span fins 30 and 32, the sum of the moments applied to the vehicle 10 is - 2(0.707)(d) clockwise - 2(0.707)(d) clockwise + 2(0.707)(2d) counterclockwise + 2(0.707)(2d) counterclockwise. This number would be 8.49d if both fins 20 were 100% effective fins (4.0 for force and 2.12d for arm). Thus, 2.82 divided by 8.49 indicates that the illustrated control arrangement 26 is 33% efficient as two horizontally disposed control fin members. It is believed that this is acceptable for most applications while less preferable to that of the preferred embodiment.

Figure 11:
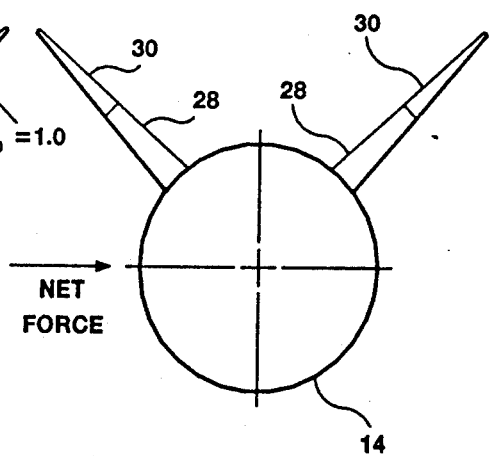
FIG. 11 is a diagrammatic view which illustrates the net lateral force that may be applied by the second control arrangement to correct an undesirable yaw condition of the air vehicle.
Figure 12:
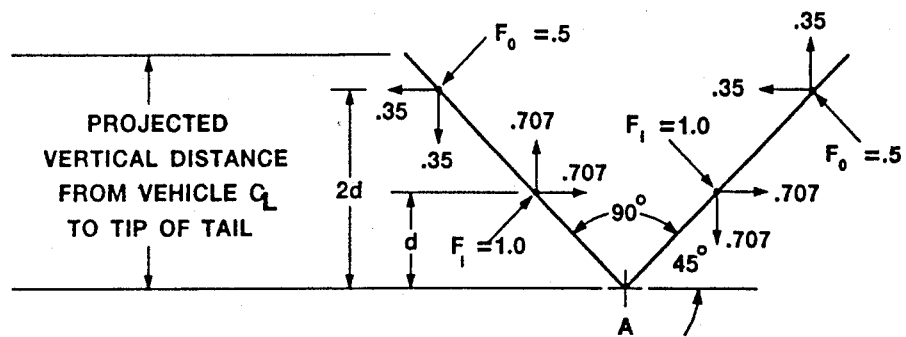
FIG. 12 is a simplified diagrammatic force diagram for comparing the net lateral force provided by the second embodiment control arrangement to a conventional control arrangement.

In FIGS. 11 and 12 it will be illustrated how the control arrangement of the second embodiment of the invention compares to a conventional tail control arrangement for a undesired yaw condition of the air vehicle 10. In this instance the sum of the vertical forces exerted on the air vehicle 10 is zero as are the sum of the moments. The sum of the horizontal forces is 2(0.707) right less 2(0.35) left which results in a force of 0.707 right. If a vertical tail fin had been used the number would be 2.0. Thus, when 0.707 is divided by 2.0 it is apparent that the control arrangement 12 of the present invention is 35 efficient as a conventional tail fin arrangement, a comparison which is acceptable for most applications of the air vehicle 10.

Figure 13:
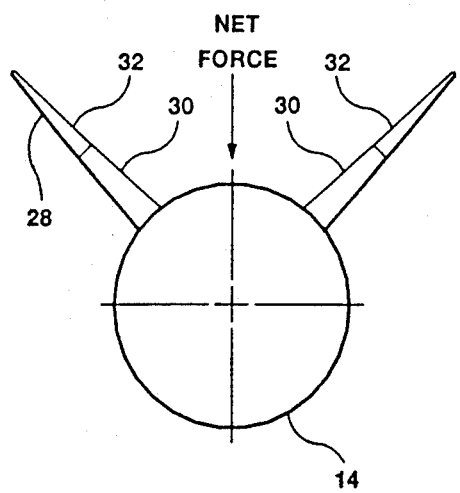
FIG. 13 is a diagrammatic end view which illustrates the net vertical force that may be applied by the second embodiment control arrangement to correct an undesirable pitch condition of the air vehicle.
Figure 14:
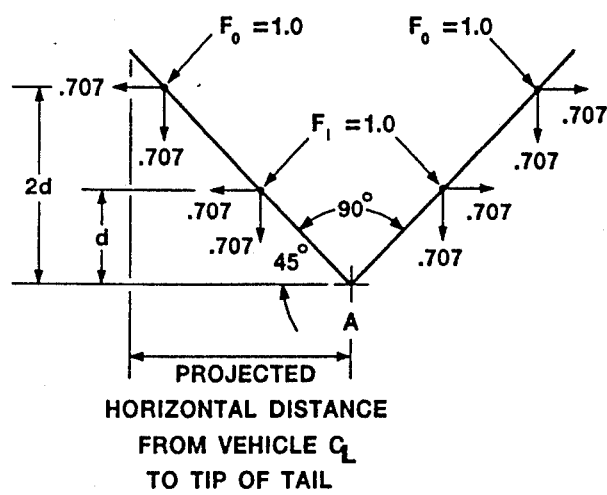
FIG. 14 is a simplified diagrammatic force diagram for comparing the net vertical force to correct pitch provided by the second embodiment control arrangement to a conventional control arrangement.

Referring now to FIGS. 13 and 14, a comparison of the control arrangement of the second embodiment will be compared to a conventional tail arrangement for an undesired pitch condition. In this instance it is to be understood that the summation of the horizontal forces and the moments exerted on the air vehicle 10 are zero. The summation of the vertical forces is 4(0.707) down which equals 2.82 down. This number would be 4.0 if the two fins were to be disposed horizontally in the conventional arrangement. Thus, 2.82 divided by 4.00 indicates that the split span vee fin of the present invention is 70.7% efficient as the conventional horizontal tail arrangement. Again, this comparison indicates a suitable comparison for most applications of the air vehicle 10.

Figure 15:
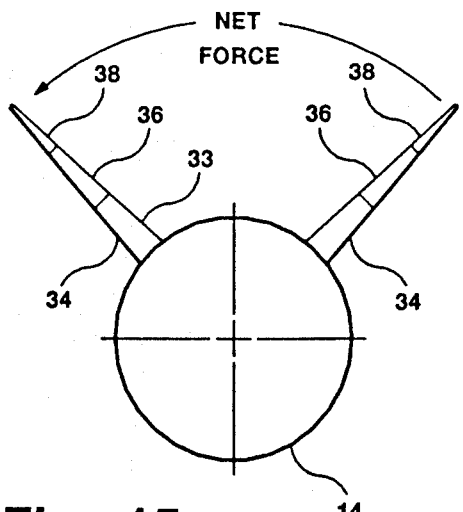
FIG. 15 is a diagrammatic end view which illustrates the net torque that may be applied by a third embodiment of the novel control arrangement to correct an undesirable roll condition of the air vehicle.
Figure 16:
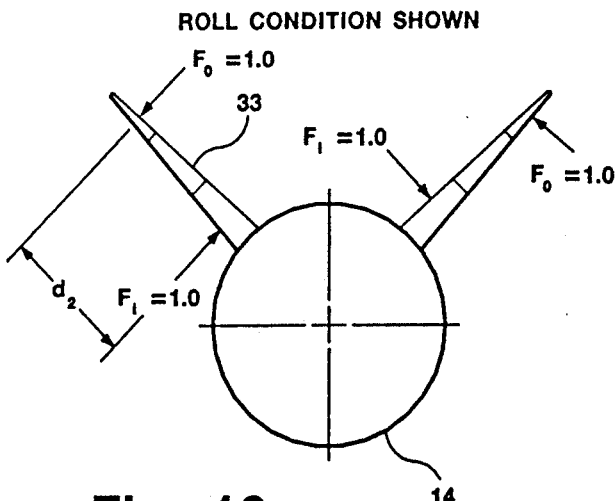
FIG. 16 is a diagrammatic end view of the third embodiment control arrangement that illustrates the force that is applied to correct an undesirable roll condition of an air vehicle.

Referring now to FIGS. 15 and 16, yet another embodiment of the invention is illustrated. In this third embodiment of the invention each split span fin 33 is provided with and inner in member 34, and intermediate fin member 36, and an outer fin member 38. The fin members 34, 36, and 38 all fall within the same plane, as with the second embodiment of the invention, and each are independently controllable.

The third embodiment is believed to possess certain advantages over the second embodiment which provides two rather than three fin members in the same plane. For example, the corrective roll torque is increased. The distance d2 will be larger between inner and outer fin members than the corresponding distance (d/0.707) for the two fin members in the same plane configuration. Therefore, for the same inner and outer panel forces the torque will be larger. As shown in FIG. 16, the degree of spacing for each split fin 33 from a vertical is between 0 degrees and 90 degrees with 45 degrees being considered to be optimum.

The foregoing has illustrated an active control arrangement for an air vehicle that includes a split span fin tail control arrangement whereby the inner and outer spans of each fin are independently operable to provide yaw, roll, and pitch control for and air vehicle in flight. This novel arrangement has been demonstrated to be acceptably comparable in control to the conventional three surface arrangement and provides certain desired advantages by the elimination of the vertical orthogonal surface. The orthogonal coordinate control system provides a horizontal axis parallel to the mean plane of the wings.

Although the present invention has been shown and described with reference to particular embodiments, nevertheless, various changes and modifications obvious to one skilled in the art to which the invention pertains are deemed with the purview of the invention.

We claim:

1. A self propelled air vehicle comprising:
   an elongated aerodynamically shaped vehicle body adapted for flight;
   wing means secured to the vehicle body to provide lift during flight of the air vehicle; and
   control surface means attached to the aft end of the vehicle to provide yaw, pitch, and roll control of the vehicle when it is in flight;
   the control surface means including a pair of radially extending spaced apart control fins, each control fin providing at least inner and outer fin members, at least one of said inner and outer fin members of each of said pair of control fins being independently operable separate from the like fin member of the opposite control fin.

2. The self propelled air vehicle of claim 1 wherein the control fins as they extend radially from the vehicle body form an acute angle.

3. The self propelled air vehicle of claim 1 wherein the control fins as they extend radially from the vehicle body form a right angle.

4. The self propelled air vehicle of claim 1 wherein said inner and outer fin members are rotatable.

5. The self propelled air vehicle of claim 4 wherein the inner and outer fin members of each fin do not fall within the same plane.

6. The self propelled air vehicle of claim 5 wherein each inner fin member is positioned from 0 degrees to 90 degrees from the vertical center line of the vehicle.

7. The self propelled air vehicle of claim 6 wherein each inner fin member is positioned 45 degrees from the vertical center line of the vehicle.

8. The self propelled air vehicle of claim 6 wherein each outer fin member is positioned 0 degrees to 90 degrees from the vertical center line of the vehicle.

9. The self propelled air vehicle of claim 8 wherein each outer fin member is positioned 90 degrees from the vertical center line of the vehicle.

10. The self propelled air vehicle of claim 4 wherein the spanwise length of the inner and outer span fin members are equal.

11. The self propelled air vehicle of claim 4 wherein the spanwise length of the inner and outer span fin members are unequal.

12. The self propelled air vehicle of claim 4 wherein the inner span fin members of both control fin members are operable together.

13. The self propelled air vehicle of claim 4 wherein the outer span fin members of both control fin members are operable together.

14. The self propelled air vehicle of claim wherein the inner span fin members of both control fin members are operable independently.

15. The self propelled air vehicle of claim 4 wherein the outer span fin members of both control fin members are operable independently.

16. An active control arrangement to provide roll, yaw, and pitch control for self propelled air vehicle during flight, which arrangement comprises:
a pair of spaced apart control fin members which extend radially from the tail section of the air vehicle, each control fin member providing at least inner and outer span fin members, at least one of said inner and outer span fin members of each of said pair of control fins being independently operable separate from the like fin member of the opposite control fin.

17. The active control arrangement according to claim 16 wherein the control fin members as they extend radially from the air vehicle form an acute angle.

18. The active control arrangement according to claim 16 wherein the control fin members as they extend radially from the air vehicle form a right angle.

19. The active control arrangement according to claim 16 wherein the span of the inner and outer span fin members are unequal.

20. The active control arrangement according claim 16 wherein the span of the inner and outer span fin members are equal.

21. The active control arrangement according to claim 16 wherein the inner span fin members of both control fin members operate together.

22. The active control arrangement according to claim 16 wherein the outer span fin members of both control fin members operate together.

23. The active control arrangement according to claim 16 wherein the inner span fin members of both control fin members operated independently of each other.

24. The active control arrangement according to claim 16 wherein the outer span fin members of both control fin members operate independently of each other.

25. The active control arrangement according to claim 16 wherein each control fin member provides at least three variable control surfaces.

26. The active control arrangement according to claim 25 wherein each control fin member further includes an intermediate span fin member.

27. The active control arrangement according to claim 26 where each inner, intermediate, and outer fin member is independently rotatable from an adjacent fin member.

28. The active control arrangement according to claim 26 wherein the inner, intermediate, and outer span fin members of each fin fall within a common plane.

29. The active control arrangement according to claim 26 wherein the inner, intermediate, and outer span fin members of each fin do not fall within a common plane.

* * * * *

UNITED STATES PATENT AND TRADEMARK OFFICE
CERTIFICATE OF CORRECTION

PATENT NO. : 5,224,665
DATED : July 6, 1993
INVENTOR(S) : Jon A. Goldsberry, et. al.

It is certified that error appears in the above-identified patent and that said Letters Patent is hereby corrected as shown below:

Title page, item [73], Assignee: should read-- Hughes Missile Systems General Dynamics Corporation."--

Signed and Sealed this

Second Day of June, 1998

Attest:

BRUCE LEHMAN

Attesting Officer

Commissioner of Patents and Trademarks